United States Patent
Raman et al.

(10) Patent No.: US 11,345,438 B2
(45) Date of Patent: May 31, 2022

(54) VEHICLE WITH A POWER UNIT

(71) Applicant: TVS MOTOR COMPANY LIMITED, Chennai (IN)

(72) Inventors: Dinesh Raman, Chennai (IN); Rupesh Arvindakshan, Chennai (IN); Vaisakh A N, Chennai (IN); Hema Sindhura Kotam, Chennai (IN); Elias Chothirakunnil Abraham, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 115 days.

(21) Appl. No.: 16/965,813

(22) PCT Filed: Feb. 8, 2019

(86) PCT No.: PCT/IN2019/050100
§ 371 (c)(1),
(2) Date: Jul. 29, 2020

(87) PCT Pub. No.: WO2019/155494
PCT Pub. Date: Aug. 15, 2019

(65) Prior Publication Data
US 2021/0047000 A1    Feb. 18, 2021

(30) Foreign Application Priority Data
Feb. 8, 2018   (IN) .............................. 201841004809

(51) Int. Cl.
*B62M 7/02*   (2006.01)
*B62J 40/00*  (2020.01)
(Continued)

(52) U.S. Cl.
CPC ................. *B62M 7/02* (2013.01); *B60K 6/40* (2013.01); *B62J 1/00* (2013.01); *B62J 25/06* (2020.02);
(Continued)

(58) Field of Classification Search
CPC .................................. B62J 25/06; B62J 40/00
(Continued)

(56) References Cited

U.S. PATENT DOCUMENTS 7,832,516 B2 * 11/2010 Bagnariol ................. B60J 1/04
                                                         180/219
8,393,630 B2   3/2013 Ikeda
(Continued)

FOREIGN PATENT DOCUMENTS

JP     2019043390 A * 3/2019   ............. B62J 43/28

OTHER PUBLICATIONS

International Search Report issued in corresponding International Application No. PCT/IN2019/050100 dated Jun. 26, 2019 (3 pages).
(Continued)

*Primary Examiner* — Kevin Hurley
*Assistant Examiner* — Hosam Shabara
(74) *Attorney, Agent, or Firm* — Osha Bergman Watanabe & Burton LLP

(57) ABSTRACT

A vehicle with a power unit includes: a body frame with said power unit mounted to said body frame; at least one front wheel supported by the body frame in a front portion, and at least one rear wheel supported by the body frame in a rear portion; an electric machine capable of assisting said power unit; and an auxiliary power source electrically connected to said electric machine. The vehicle further includes a first set of foot pegs for a rider and a second set of foot pegs for a pillion. A quadrilateral region is defined between said first set of foot pegs and said second set of foot pegs, and said
(Continued)

electric machine and said auxiliary power source are disposed substantially within said quadrilateral region when viewed from vehicle top.

10 Claims, 3 Drawing Sheets

(51) Int. Cl.
    *B62J 25/06*      (2020.01)
    *B62J 1/00*      (2006.01)
    *B62K 11/04*      (2006.01)
    *B62J 27/00*      (2020.01)
    *B62K 25/28*      (2006.01)
    *B60K 6/40*      (2007.10)
    *B60K 6/22*      (2007.10)
    *B60K 6/48*      (2007.10)

(52) U.S. Cl.
    CPC ............... *B62J 27/00* (2013.01); *B62J 40/00* (2020.02); *B62K 11/04* (2013.01); *B62K 25/283* (2013.01); *B60K 6/22* (2013.01); *B60K 6/48* (2013.01); *B60Y 2200/12* (2013.01); *B60Y 2200/92* (2013.01)

(58) Field of Classification Search
    USPC ........................................................ 180/220
    See application file for complete search history.

(56) References Cited

U.S. PATENT DOCUMENTS

| | | | |
|---|---|---|---|
| 10,501,140 B2* | 12/2019 | Underland | ............... B62M 7/06 |
| 2008/0047389 A1* | 2/2008 | LeClaire | .................. B62J 25/06 |
| | | | 74/564 |
| 2013/0168171 A1 | 7/2013 | Buell et al. | |

OTHER PUBLICATIONS

Written Opinion of the International Searching Authority issued in corresponding International Application No. PCT/N2019/050100 dated Jun. 26, 2019 (4 pages).

* cited by examiner

VEHICLE WITH A POWER UNIT

TECHNICAL FIELD

The present subject matter relates generally to a vehicle and more particularly to a saddle ride type of vehicle incorporating a front wheel and a rear wheel.

BACKGROUND

Generally, in a two-wheeled or a three-wheeled vehicle a body frame extends rearward from a head tube. The body frame acts as a skeleton for the vehicle that supports the vehicle loads. A front portion of the body frame supports one or more front wheel(s) through one or more front suspension(s). Further, the body frame extends rearward towards a rear portion of the vehicle. One or more rear wheel(s) is connected to a body frame through one or more rear suspension(s). A power unit is either fixedly mounted or swingably connected to the body frame of the vehicle. Further, the power unit is functionally connected to at least one wheel of the vehicle, which provides the forward/rearward motion to the vehicle. The forward or rearward motion of the vehicle is achieved by the rotation of the wheels. The vehicle is provided with a headlamp and a tail lamp that provide visibility to the rider and provides safe driving conditions for drivers behind, respectively.

BRIEF DESCRIPTION OF THE DRAWINGS

The detailed description of the present subject matter is described with reference to the accompanying figures. Same numbers are used throughout the drawings to reference like features and components.

DETAILED DESCRIPTION

Figure 1:
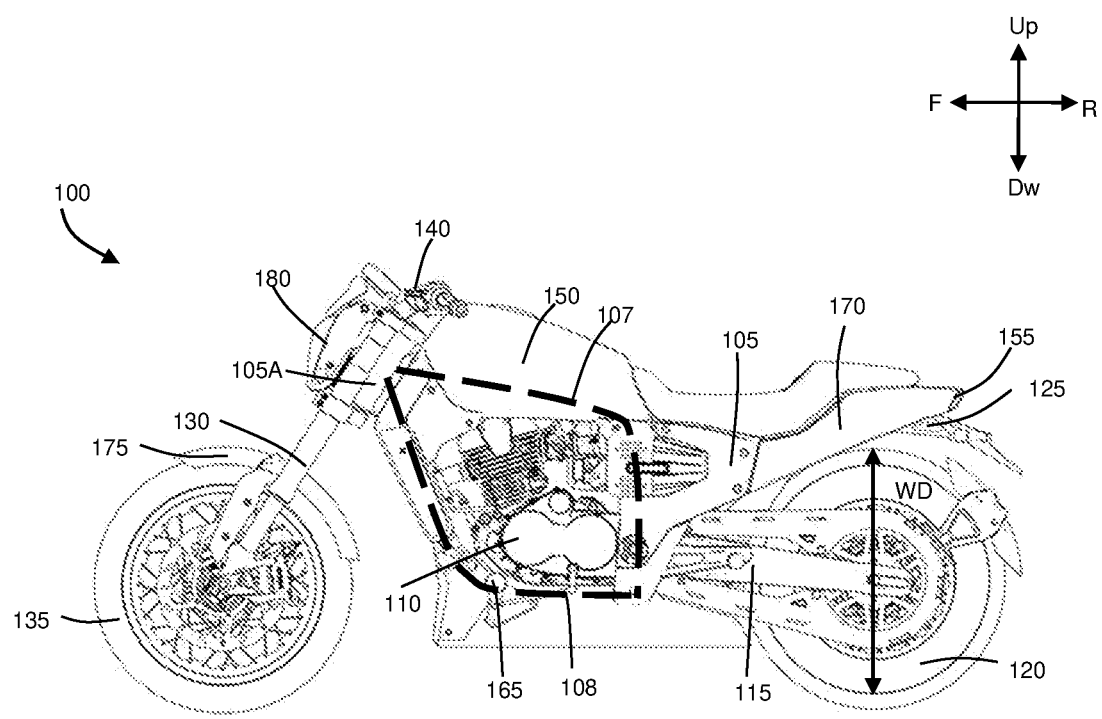
FIG. 1 illustrates a left side view of an exemplary vehicle, in accordance with an embodiment of the present subject matter.

Typically, the two-wheeled or three-wheeled vehicles, which are colloquially referred to motorcycles, scooter, trike, auto-rickshaw etc., are provided with one or more front wheels disposed in the front and a rear wheel disposed in the rear. Such vehicles incorporate a power unit that includes an internal combustion engine. Generally, depending upon the vehicle layout, the vehicles are selected for various applications; for example, vehicles with higher center of gravity may require easy maneuverability, especially in case of rally vehicles. Another type of vehicle requires balanced maneuverability that is used for city rides, which are referred to as commuter vehicles. Yet another category of vehicles is also available that are used for long rides and are colloquially referred to as cruisers, which offer higher stability. Cruiser type of vehicles is gaining popularity due to their comfortable riding postures. However, there arises a challenge to provide a cruiser type vehicle in city riding conditions.

However, the conventional cruiser is bulkier and heavy owing to the larger engine capacity and other vehicle equipment like storage space thereby making it difficult to operate with higher agility especially in city riding conditions. Also, conventionally known cruisers offer poor ground clearance making them difficult to operate. Moreover, in case of motorcycle type of vehicles having longer wheel base unbalanced distribution of weight of the power unit on both the suspensions and the wheels of the vehicle may occur offering poor riding experience due to substantial asymmetric distribution of forces. Moreover, with the advent in technology and for safety requirements the vehicles are to be provided with various additional sub-systems like electric motors, batteries, and other systems like ABS. The various sub-systems are provided on the vehicle, which may require major vehicle layout modifications, that again makes the vehicle bulkier and may even result in unbalanced distribution of weight thereby. Also, the vehicle may offer instability creating pull-effect towards one of the sides of the vehicle offering poor ridabilty. Also, the positon of the swingarm-pivot is one of the critical points in the vehicle as that provides the contact with the chassis of the vehicle transferring the force the rear driving wheel & determines the wheel rate which substantially influences the ride & handling dynamics of the vehicle.

Also, the vehicle either incorporating the electric motor alongside an IC engine or purely driven by the electric motor requires that the batteries be disposed in the vehicle. The batteries that drive the electric motor are to be accommodated in the vehicle. Typically, the batteries are either placed rearward to the front wheel or are disposed below the seat assembly. This brings down the vehicle center of gravity to substantially lower portion of the vehicle making it difficult to maneuver. At the same time the batteries are substantially at lower portion, thereby making the batteries prone to be damaged during bumps and also when exposing the battery casing to atmosphere making it susceptible to dust or dirt. Disposing the energy unit or battery upwards leads to push lifting the rider seating height from ground which adversely affects the comfort, ground reach, ergonomics, aesthetics as well as dynamics of the vehicle in addition to aerodynamic stability at higher speeds.

The rider of the vehicle also should have a comfortable riding posture with minimum effort for maneuvering the vehicle through the handlebar.

Thus, there is a need addressing the aforementioned and other problems in the prior art. There is a need for a vehicle with a power unit that is capable of offering high stability and at the same time offering comfortable riding, ground reach. Also, the vehicle should be feasible to be driven even city road conditions.

Hence, the present subject matter provides a vehicle that addresses the aforementioned and other problems in the prior art.

It is a feature that the present subject matter that the vehicle is provided with a power unit that includes at least one of an internal combustion (IC) engine or traction motor, and the IC engine can be a forward or a rearward inclined engine that can be compactly packaged within the vehicle.

The power unit comprising the IC engine includes an electric motor/electric machine that is functionally coupled to the rear wheel of the vehicle. The electric machine can be an integrated starter generator (ISG) that is operated using an auxiliary power source. In one implementation, the ISG is operated at a voltage 48-60 volts that is driven by a battery rated at respective voltage rating of the electric machine. In one embodiment, alongside the ISG, a magneto/alternator maybe provided to specifically for power generation. The magneto/alternator is also deposed within the quadrilateral region.

It is a feature that the present subject matter that the vehicle includes a sub-frame that supports the seat assembly.

In one embodiment, the sub-frame is an integrated casted part that is made of any known metal or fiber reinforced plastic. The seat assembly is provided with a length substantially in the range of 600 to 650 millimeters that is capable of accommodating a rider and a pillion rider and the seat assembly is disposed in the rear portion of the vehicle.

Further, the seat assembly is having a rider seat with a height disposed in the range of 650 to 750 millimeters from the ground thereby offering sufficient seat height SH to the riders. A pillion seat is provided at a height substantially greater than the height of the rider seat thereby accommodating two riders comfortably.

Further, it is a feature that the vehicle is provided with wheels having a diameter in the range of 400 to 450 millimeters thereby offering larger wheels for comfortable ride even in bump condition or when passing through pot holes.

The vehicle includes a wheelbase in the range of 1400 to 1600 millimeters thereby providing stability for long rides and also city rides. Further, a ratio of wheelbase to a seat height is provided substantially in the range of 1.5 to 2.5, and the power unit includes at least a portion disposed within the quadrilateral region and an imaginary vertical passing through a crankshaft of the power unit substantially cuts through a longitudinal mid-portion of the wheelbase when viewed from vehicle side. Thus, the ratio 1.5 to 2.5 of the wheelbase to seat height offers required stability even in low speed conditions and a comfortable seating position for the rider with respect to reach of the handle bar and ease of maneuverability for the user in low-speed city riding conditions.

It is a feature that the power unit comprising the IC engine includes a crankshaft disposed substantially along the longitudinal center of the wheelbase. Thus, the power unit which is substantially one of the heaviest parts of the vehicle is disposed substantially at longitudinal center.

The vehicle includes a quadrilateral region is formed between the foot pegs of both the rider and the pillion, and the quadrilateral region is substantially disposed at a mid-portion of the vehicle.

It is a feature the electric machine like ISG and the auxiliary power source are disposed substantially within the quadrilateral region offering optimum weight distribution within the vehicle.

Arrows provided in the top right corner of each figure depicts direction with respect to the vehicle, wherein an arrow F denotes front direction, an arrow R indicates rear direction, an arrow Up denotes upward direction, and an arrow Dw denotes downward direction.

FIG. 1 illustrates a left side view of an exemplary motor vehicle 100, in accordance with an embodiment of the present subject matter. The vehicle 100 includes a body frame 105 that extends from a head tube 105A, which is disposed in the front portion of the vehicle 100, extending towards a rear portion of the vehicle 100. The body frame 105 extends in longitudinal direction F-R of the vehicle 100. The body frame 105 may further comprise a sub-frame formed by a pair of rear tubes (not shown) that extend obliquely rearward from the main frame. A power unit 110 is fixedly mounted to the body frame 105.

The power unit 100 includes at least one of an internal combustion engine and a traction/electrical motor (not shown). A front portion of a swing arm 115 is swingably connected to the body frame 105 and a rear portion of the swing arm 115 rotatably supports a rear wheel 120. The rear wheel 120 is functionally coupled to the power unit 110 through a transmission system. The transmission system (not shown) includes a chain drive/belt drive, a variable gear ratio system, or an automatic type transmission. A rear fender 125 disposed upwardly of the rear wheel 120 covers at least a portion of the rear wheel 120. Further, the swing arm 115 is coupled to the body frame 105 through one or more rear suspension(s) (not shown). In the present embodiment, a mono-shock type rear suspension connects the swing arm 115 to the body frame 105. Similarly, a pair of front forks 130, form a front suspension 130, supports a front wheel 135 and is steerably supported by the head tube 105A. A handlebar assembly 140 is connected to an upper portion of the pair of front forks 130. The handlebar assembly 140 includes a handle bar (not shown) that is having a tapering diameter when moving from lateral center towards lateral sides of the vehicle 100. Further, a front fender 175 covers at least a portion of the front wheel 135 and the front fender 175 is mounted to the front forks 130.

A fuel tank assembly 150 is mounted to the body frame 105 and is disposed rearwardly of the handlebar assembly 140. A seat assembly 155 including a rider seat is disposed rearwardly of the fuel tank assembly 150 and is supported by the body frame 105. The seat assembly may include a pillion seat. Further, a pair of rider foot pegs 165 mounted to the body frame 105 of the vehicle 100 that enable in supporting rider foot.

Further, the power unit 110 includes an air-fuel supply system (not shown) that supplies air and fuel thereto. An exhaust pipe (not shown) extends from the engine assembly 110 towards a muffler (not shown) that is disposed adjacently of the rear wheel 120.

Furthermore, the vehicle 100 includes various electrical and electronic systems including a starter motor (not shown), a headlamp assembly 180, a vehicle control unit, and a tail lamp device 181. The vehicle 100 is provided with a rear cover assembly 170 that is extending downward from the seat assembly 155 and is substantially enclosing the tail lamp device 181. In addition, the vehicle includes safety systems including a synchronous braking system (not shown), and an anti-lock braking system.

Figure 2:
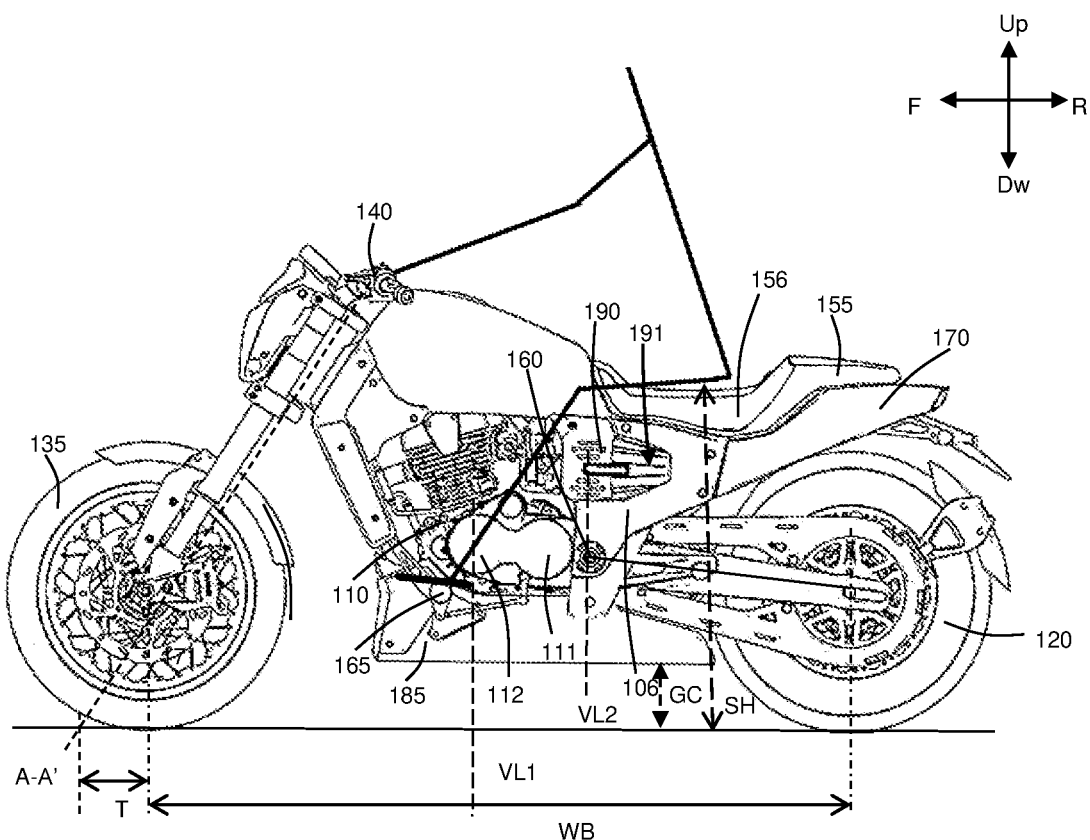
FIG. 2 illustrates another left side view of the vehicle, in accordance with the embodiment of FIG. 1.
Figure 3:
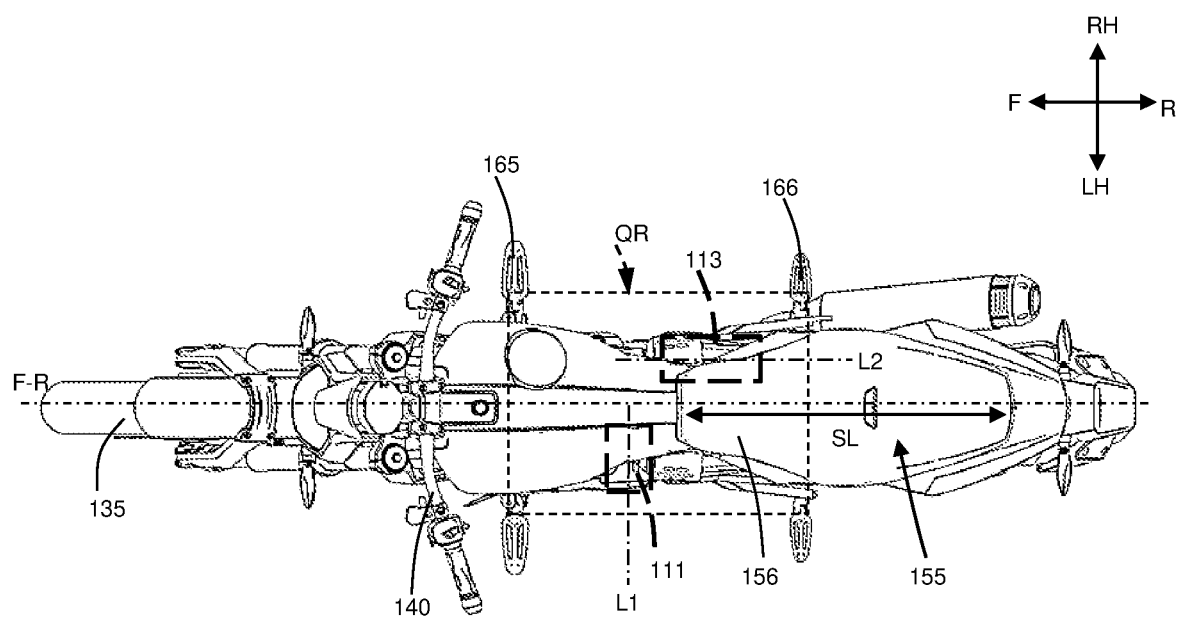
FIG. 3 depicts a top view of the vehicle, in accordance with the embodiment of FIG. 1.

FIG. 2 depicts another left side view of the vehicle with a schematic rider, in accordance with the embodiment of FIG. 1. The vehicle 100 is provided with a power unit 110 that includes an internal combustion engine comprising a forward or a rearward inclined engine that can be compactly packaged within the vehicle 100. The IC engine is having a capacity in the range of 100-600 cubic centimeters (cc). The power unit 110 includes an electric machine 111 that is functionally coupled to the rear wheel 120 of the vehicle 100. The electric machine 111 can be an integrated starter generator (ISG) that is operated using an auxiliary power source 113 (shown in FIG. 3). The electric machine 111 is capable of assisting the power unit (110) in certain conditions. In one implementation, the ISG 111 is a 48 volts type that is driven by a 48 volts auxiliary power source 113. However, the rating of the ISG and corresponding rating of the auxiliary power source can be modified as per requirement.

The power unit 110 is supported by a main frame 107, 108 of the body frame 105. The main frame 107, 108 substantially surrounds and supports the power unit 110. The body frame 105 is provided with a sub-frame 106 secured to the main frame 107, 108 and the sub-fame 106 is extending inclinedly rearward towards a rear portion of the vehicle 100. The seat assembly 155 is mounted to the sub-frame 106 and is having a seat length SL (shown in FIG. 3) substantially in the range of 600 to 650 millimeters. Further, the seat assembly 155 is having a rider seat height SH disposed at a height SH from the ground, wherein the height SH in the range of 650 to 750 millimeters. Moreover, the vehicle 100 is provided with a ratio of a seat length SL (shown in FIG. 3) to a wheel diameter WD (shown in FIG. 1) in the range of 1.4 to 1.6, and the rider seat 156 at least partially overlaps with the quadrilateral region QR. Thus, the vehicle 100 is provided with the seat length SL that can comfortably accommodated a pillion rider even in the cruiser type configuration. Also, a ratio of a seat height SH of a rider seat 156 to a ground clearance GC of the vehicle 100 is provided in the range of 3.8 to 5.0, and wherein the rider seat 156 at least partially overlaps with the quadrilateral region QR. The seat assembly 155 is disposed at a comfortable height from the ground offering with low height and at the same time maintaining optimal ground clearance with avoid bumps etc. A rider seat 156 of the seat assembly 155 at least partially overlaps with the quadrilateral region QR when viewed from top. Thus, the vehicle 100 has the rider weight within the quadrilateral region QR enabling optimum weight distribution offering ease of maneuverability and stability.

The body frame 105 of the vehicle 100 supports the front wheel 135 and the rear wheel 120 that are preferably having a diameter WD in the range of 16 to 18 inches or 400 to 450 millimeters. A ratio of a seat height SH to a wheel diameter WD of the vehicle 100 in the range of 1.4 to 2, and the rider seat 156 of the seat assembly 155 at least partially overlaps with the quadrilateral region QR. Thus, the ratio of the seat height SH to wheel diameter WD offers sufficient clearance of suspension of the wheels during bump conditions or the like at the same time maintaining optimal seat height SH from the ground. Further, the front wheel 135 and the rear wheel 120 provide a wheelbase WB in the range of 1400 to 1600 millimeters. The power unit 110 includes at least a portion disposed within the quadrilateral region QR and an imaginary vertical VL1 drawn to be passing through a crankshaft 112 of the power unit 110 substantially cuts through a longitudinal mid-portion of the wheelbase WB when viewed from vehicle side. Thus, the crankshaft 112/crankshaft axis is substantially at mid-portion of the wheels offering improved weight distribution in a vertical type power unit 110.

Further, a ratio of a wheelbase WB to a ground clearance GC of the vehicle 100 is in the range of 8 to 10.5 whereby the wheelbase WB with the vertical line VL1 cutting through a substantial mid-portion offers optimum weight distribution and the power unit 110 is optimally disposed between the wheels 120, 135.

The power unit 110 comprising the IC engine includes a crankshaft 112 disposed substantially along the longitudinal center of the wheelbase WB. FIG. 2 schematically represents the position of the crankshaft by 112, which is enclosed by a crankcase of the power unit 110. Thus, the power unit 110 is substantially disposed at the longitudinal center of the vehicle thereby offering substantially even weight distribution from the power unit 110. Thus, an imaginary vertical line passing through the crankshaft 112 is substantially at a mid-portion of the wheelbase. Also, any impacts from the wheels 135, 120 have to travel substantial distance to reach the power unit 110 or vice-versa. Further, the vehicle 100 includes a protector casing 185 that is substantially covering the bottom portion and lateral sides of the power until 110. Also, in one embodiment, the protector casing 185 is disposed substantially below the power unit 110 and is substantially having a length equal to a longitudinal length of the quadrilateral region QR. The protector casing 185 is substantially having a lower most portion providing a ground clearance GC in the range of 150-170 millimeters whereby vehicle 100 offers sufficient ground clearance GC to enable ease of operation in city riding conditions. Further, offering comfortable riding posture and improved stability a steering axis A-A' of the steering assembly is provided with a caster angle in the range of 25-40 degrees. Also, the steering angle is provided with a steering trail T in the range of 120-130 millimeters. The steering angle is provided with a ratio of a wheel base WB to the steering trail T in the range of 10.5 to 13.5. Thus, the vehicle 100 with the aforementioned steering trail T offers optimum orientation of the handlebar 140 for the user to hold with minimal effort. Also, this enables the user to sit in an upright position with the first set of foot pegs 165 disposed ahead of the vertical line VL1 whereby the user legs are positioned away from the heat dissipating region (cylinder head/cylinder block) of the vehicle 100.

Also, the vehicle 100 includes a protector casing 185 disposed substantially below the power unit 110 having a length equal to a longitudinal length of the quadrilateral region QR. A seat length (SL) to a wheel diameter (WD) of the vehicle (100) in the range of 1.4 to 2.

Further, the vehicle 100 includes a pair of rider foot rests 165 disposed substantially adjacent to the power unit 110 (shown in FIG. 2). Also, a pair of pillion foot rests 166 are disposed rearward of the power unit 110 and adjacent to the rear wheel 120. A quadrilateral region QR is formed between the foot pegs 165 and 166 that are substantially a longitudinal mid-portion of the vehicle 100. The quadrilateral region QR has a first side between laterally adjacently disposed first set of pegs 165, a second side between longitudinally adjacent disposed pegs on one side, a third side between the laterally adjacently disposed second set of pegs 166, and a fourth side between longitudinally adjacently disposed pegs on other lateral side.

The quadrilateral region QR is accommodating the ISG 111 and the auxiliary power source 113 of the vehicle 100. The vehicle 100 comprises of the ISG 111 acting as an electric machine cum generator is mounted to the power unit 110. For example, directly onto the crankshaft 112 of the IC engine or on a shaft disposed parallel to the crankshaft 112. Therefore, the ISG 111 is disposed on lateral side of the power unit 110. The ISG 111 is electrically driven by the auxiliary power source 113 disposed on other lateral side of the vehicle 100. In the present embodiment, the auxiliary power source 113 is mounted to sub-frame 106 of the body frame 105. The auxiliary power source 113 and the ISG 111 are disposed substantially within the quadrilateral region QR defined by the foot pegs.

In one embodiment, the vehicle 100 is provided with a pivot point 160 for swingably connecting a swingarm 115 of the vehicle 100, wherein the pivot point 160 is formed on the sub-fame 106. A second imaginary vertical line VL2 drawn to be passing through the pivot point 160 cuts through a longitudinal mid-portion of the quadrilateral region QR when viewed from vehicle side. Thus, at least a portion of the sub-frame 106 accommodating the pivot point 160 that is having a pivot axis of the swingarm 115 is also accommodated within the quadrilateral region QR thereby enabling optimum wright distribution of the rear portion of the vehicle 100 by the body frame 105.

In one embodiment, the auxiliary power source 113 is disposed at a substantial height with respect to the height of the ISG 111. The auxiliary power source 113 can be any of a Lead-acid battery, a Lithium-ion battery, a fuel cell or the like. In a preferred embodiment, a Li-ion battery is provided that is having a cooling portion that is at least partially exposed to the atmosphere to enable cooling. In case of a Li-ion battery, the battery is elongated substantially in longitudinal duration F-R of the vehicle 100. Further, the ISG 111 is disposed on other opposite side of the vehicle and the ISG 111 is enclosed by the crankcase cover or by an additional cover as feasible. The crankcase cover is provided with plurality of cooling fins to enable cooling of the ISG 111 as the ISG is also subjected to high temperature due to high currents. Thus, the vehicle 100 of the present subject matter provides optimum cooling for the user comfort.

The electric machine 111 that is capable of selectively assisting the power unit 110 in certain conditions including conditions where a power boost is required, hill-assist, or torque-assist. The electric machine II can receive trigger from user where a control switch is provided for user to operate. In one implementation, the electric machine 111 is triggered by a control unit that received vehicle operating conditions and operates the electric machine 111.

Further, the vehicle 100 includes an air filter 190 (shown in FIG. 2) disposed on other lateral side LH thereof. The sub-frame 106 is having a cut-portion 191, wherein the cut portion is complementing and conforming to the profile of the air filter 190 that is partially exposed. In one embodiment, the air filter 190 is having a cylindrical member elongated in longitudinal direction F-R of the vehicle 100. The cut-portion 191 is having a U-shape or a V-shape that is having opening in the forward direction. Further, the air filter 190 is provide with perorated holes that enable in air flow into the air filter 190 and at the same time obstructs entry of dust. Similarly, the perforated holes are provided on the outer periphery of the auxiliary power source 113.

Further, the heavy components like the ISG 111 and the auxiliary power source 113 disposed on either lateral sides offer lateral weight distribution in the vehicle thereby offering balanced ride. In the depicted embodiment, the electric machine 111 is disposed substantially within the quadrilateral region QR and is positioned towards one lateral side of the vehicle 100 with a predetermined offset. Further, the electric machine 111 includes a motor axis L1 disposed substantially orthogonal to a long axis L2 of the auxiliary power source 113. The motor axis L1 may coincide with a long axis of the electric machine 111. Furthermore, the auxiliary power source 113 is disposed towards other lateral side of vehicle 100 with an offset from a lateral center of the vehicle 100, and wherein the auxiliary power source 113 is having a long axis L2 parallel to a longitudinal axis F-R of the vehicle 100 and is disposed rearward with respect to a position of the electric machine 11L. Further, the ISG/electric machine 111 disposed substantially downward with respect to the height of the auxiliary power source 113 also offers a balanced center of gravity that is substantially at a mid-portion therebetween thereby offering stability and also maneuverability for city riding conditions.

Many modifications and variations of the present subject matter are possible in the light of above disclosure. Therefore, within the scope of claims of the present subject matter, the present disclosure may be practiced other than as specifically described.

LIST OF REFERENCE SIGNS

| | |
|---|---|
| 100 | vehicle |
| 105 | body frame |
| 105A | head tube |
| 106 | sub-frame |
| 107, 108 | main frame |
| 110 | power unit |
| 111 | electric machine/ISG |
| 112 | crankshaft |
| 113 | auxiliary power source |
| 115 | swing arm |
| 120 | rear wheel |
| 125 | rear fender |
| 130 | front suspension/suspension assembly |
| 131 | first fork |
| 132 | second fork |
| 133 | mounting portion |
| 134 | protruded portion |
| 135 | front wheel |
| 140 | handlebar assembly |
| 150 | fuel tank assembly |
| 155 | seat assembly |
| 160 | pivot point |
| 165 | first set of foot pegs |
| 166 | second set of foot pegs |
| 170 | rear cover assembly |
| 175 | front fender |
| 180 | headlamp assembly |
| 185 | protector casing |
| 190 | air filter |
| 195 | offset |
| A-A' | steering axis |
| F-R | longitudinal axis |
| GC | ground clearance |
| QR | quadrilateral region |
| SH | seat height |
| SL | seat length |
| T | steering trail |
| L1 | long axis |
| L2 | long axis |
| VL1 | vertical line |
| VL2 | vertical line |
| WB | wheelbase |
| WD | wheel diameter |

We claim:

1. A vehicle with a power unit, said vehicle comprising:
a body frame, said power unit mounted to said body frame;
at least one front wheel supported by the body frame in a front portion, and at least one rear wheel supported by the body frame in a rear portion;
an electric machine capable of assisting said power unit; and
an auxiliary power source electrically connected to said electric machine, wherein
said vehicle further comprises a first set of foot pegs for a rider and a second set of foot pegs for a pillion,
a quadrilateral region is defined between said first set of foot pegs and said second set of foot pegs, and
said electric machine and said auxiliary power source are disposed substantially within said quadrilateral region when viewed from vehicle top.

2. The vehicle with the power unit as claimed in claim 1, wherein said vehicle is provided with a ratio of wheelbase to seat height in the range of 1.5 to 2.5, and said power unit includes at least a portion disposed within said quadrilateral region, and an imaginary vertical passing through a crankshaft of said power unit substantially cuts through a longitudinal mid-portion of the wheelbase when viewed from vehicle side.

3. The vehicle with the power unit as claimed in claim 1, wherein said vehicle is provided with a pivot point for swingably connecting a swingarm of said vehicle, wherein a second imaginary vertical line passing through said pivot point cuts through a longitudinal mid-portion of said quadrilateral region when viewed from vehicle side.

4. The vehicle with the power unit as claimed in claim 1, wherein said vehicle includes a seat assembly having a ratio of seat length to a wheel diameter in the range of 1.4 to 1.6, and a ratio of a seat height to a wheel diameter of the vehicle in the range of 1.4 to 2.0, and wherein a rider seat of said seat assembly at least partially overlaps with the quadrilateral region.

5. The vehicle with the power unit as claimed in claim 1, wherein said electric machine is mounted to said power unit and is capable of selectively assisting said power unit for driving at least one wheel of said vehicle, and wherein operation of said electric machine is by at least one of a user input or a controller input.

6. The vehicle with the power unit as claimed in claim 1, wherein said electric machine is disposed substantially within said quadrilateral region and is positioned towards one lateral side of said vehicle, and wherein said electric machine includes a motor axis disposed substantially orthogonal to a long axis of said auxiliary power source.

7. The vehicle with the power unit as claimed in claim 1, wherein said auxiliary power source is disposed towards other lateral side of vehicle with an offset from a lateral center of said vehicle, and wherein said auxiliary power source having a long axis parallel to a longitudinal axis of said vehicle is disposed rearward with respect to a position of said electric machine.

8. The vehicle with the power unit as claimed in claim 1, wherein said vehicle includes a protector casing disposed substantially below the power unit and said protector casing having a length substantially equal to a longitudinal length of said quadrilateral region, and wherein said vehicle provided with a ratio of a seat height to a ground clearance in the range of 3.8 to 5.0 and a ratio of a wheelbase to a ground clearance in the range of 8 to 10.5.

9. The vehicle with the power unit as claimed in claim 1, wherein said vehicle includes a steering axis of a steering assembly provided with a caster angle in the range of 25-40 degrees, and said steering angle is provided with a ratio of a wheel base to a steering trail in the range of 105 to 13.5.

10. The vehicle with the power unit as claimed in claim 1, wherein said vehicle includes an air filter disposed a lateral side of said vehicle and is supported by a sub-frame of said body frame, said sub-frame is having a cut-portion having a U-shape or a V-shape at least partially exposing said air filter.

* * * * *